United States Patent
Helmeke

(10) Patent No.: US 11,725,127 B2
(45) Date of Patent: Aug. 15, 2023

(54) HEAT RESISTANT HOT MELT MOISTURE CURE ADHESIVE COMPOSITION AND ARTICLES INCLUDING THE SAME

(71) Applicant: H.B. Fuller Company, St. Paul, MN (US)

(72) Inventor: Marietta B. Helmeke, Little Canada, MN (US)

(73) Assignee: H.B. Fuller Company, St. Paul, MN (US)

( * ) Notice: Subject to any disclaimer, the term of this patent is extended or adjusted under 35 U.S.C. 154(b) by 175 days.

(21) Appl. No.: 17/184,958

(22) Filed: Feb. 25, 2021

(65) Prior Publication Data

US 2021/0269687 A1    Sep. 2, 2021

Related U.S. Application Data

(60) Provisional application No. 62/983,297, filed on Feb. 28, 2020.

(51) Int. Cl.
| | |
|---|---|
| *C09J 175/06* | (2006.01) |
| *B32B 5/02* | (2006.01) |
| *B32B 7/12* | (2006.01) |
| *C08G 18/12* | (2006.01) |
| *C08G 18/42* | (2006.01) |
| *C08G 18/76* | (2006.01) |
| *C08K 5/00* | (2006.01) |
| *C09J 5/06* | (2006.01) |
| *C09J 9/00* | (2006.01) |

(52) U.S. Cl.
CPC ............... *C09J 175/06* (2013.01); *B32B 5/02* (2013.01); *B32B 7/12* (2013.01); *C08G 18/12* (2013.01); *C08G 18/425* (2013.01); *C08G 18/4277* (2013.01); *C08G 18/7671* (2013.01); *C08K 5/0066* (2013.01); *C09J 5/06* (2013.01); *C09J 9/00* (2013.01); *C08G 2170/20* (2013.01); *C09J 2400/263* (2013.01)

(58) Field of Classification Search
None
See application file for complete search history.

(56) References Cited

U.S. PATENT DOCUMENTS

| | | |
|---|---|---|
| 5,367,036 A | 11/1994 | Saito et al. |
| 6,280,561 B1 | 8/2001 | McInnis et al. |
| 9,982,173 B2 | 5/2018 | Janke et al. |
| 2008/0293872 A1 | 11/2008 | Loth et al. |
| 2011/0129647 A1* | 6/2011 | Duke, Jr. et al. ...... C08G 18/02 428/156 |
| 2015/0140290 A1 | 5/2015 | Johnson et al. |
| 2015/0252231 A1 | 9/2015 | Schulthess et al. |
| 2016/0046846 A1 | 2/2016 | Das et al. |
| 2017/0002239 A1 | 1/2017 | Janke et al. |
| 2019/0127618 A1 | 5/2019 | Kuramochi et al. |

FOREIGN PATENT DOCUMENTS

| | | | |
|---|---|---|---|
| EP | 587942 | * 3/1994 | ............ C08G 18/38 |
| EP | 3315528 | 5/2019 | |
| JP | 2017222758 | * 12/2017 | ............ C09J 175/06 |
| JP | 2018016703 | 2/2018 | |

OTHER PUBLICATIONS

JP-2017222758_12-2017_English Translation.*
AsahiKasei, Polycarbonate DURANOL™ product literature, prior to Feb. 28, 2020, pp. 1-23 Asahi Kasei Corp., Tokyo, Japan.
Takemoto Oil & Fat Co., Ltd, Flame Retardant product literature, prior to Feb. 28, 2020, pp. 1-11, Japan.

* cited by examiner

*Primary Examiner* — Michael L Leonard
(74) *Attorney, Agent, or Firm* — Allison Johnson; Kirsten Stone

(57) ABSTRACT

A hot melt moisture cure adhesive composition that includes a polyurethane prepolymer that includes the reaction product of diisocyanate, a polyester triol first polyol, a crystalline polyester second polyol, and a third polyol different from the first and second polyols.

20 Claims, No Drawings

HEAT RESISTANT HOT MELT MOISTURE CURE ADHESIVE COMPOSITION AND ARTICLES INCLUDING THE SAME

This application claims the benefit of U.S. Provisional Patent Application No. 62/983,297 filed on Feb. 28, 2020, which is incorporated herein.

BACKGROUND

The invention is directed to formulating hot melt moisture cure polyurethane adhesive compositions.

In some cases, certain textiles are required to exhibit a minimum level of heat resistance and flame retardant properties. Often textiles are in the form of laminates that include multiple substrates made from different materials. Adhesives are often used to bond the substrates together and to maintain the integrity of the textile laminate such that the substrates of the laminate do not debond. The differences in the nature of the substrates render selection of a useful adhesive composition very difficult. The heat resistance, flame retardance, use, and wash requirements of textile laminates also complicate the selection of an adhesive composition suitable for use in textiles. Since textiles are frequently washed or dry cleaned, for example, the adhesive composition used to bond textile laminates should exhibit resistance to debonding during textile cleaning processes. For some uses it is also important that the adhesive composition not contribute to the flammability of the textile laminate and not permit delamination of the laminate when exposed to high temperatures.

A variety of adhesive compositions exist. However, many adhesive compositions fail to maintain an adhesive bond in the presence of water or dry cleaning solvents and do not exhibit high heat resistance or flame retardant properties.

There is a need for a hot melt moisture cure polyurethane adhesive composition that exhibits heat resistance at 260° C., exhibits flame retardant properties, and withstands common textile cleaning processes.

SUMMARY

In one aspect, the invention features a hot melt moisture cure adhesive composition that includes a polyurethane prepolymer that includes the reaction product of diisocyanate, a polyester triol first polyol, a crystalline polyester second polyol, and a third polyol different from the first and second polyols. In one embodiment, the prepolymer includes the reaction product of the diisocyanate, from 1% by weight to 10% by weight of the polyester triol, from 1% by weight to 20% by weight of the crystalline polyester second polyol, and from 30% by weight to 75% by weight of the third polyol. In another embodiment, the prepolymer includes the reaction product of the diisocyanate, from 1% by weight to 6% by weight of the polyester triol, from 1% by weight to 15% by weight of the crystalline polyester second polyol, and from 50% by weight to 75% by weight of the third polyol.

In some embodiments, the composition passes the Heat Resistance test method when tested at 260° C.

In other embodiments, the composition maintains at least 50% of its tensile strength after 35 days when tested according to the Hydrolysis Resistance test method.

In another embodiment, the composition is self-extinguishing.

In one embodiment, the third polyol is selected from the group consisting of polyether polyol, polycarbonate polyol, and combinations thereof.

In some embodiments, the polyester triol includes polycaprolactone triol.

In one embodiment, the polyester triol is polycaprolactone triol and the third polyol is selected from the group consisting of polyether polyol, polycarbonate polyol, and combinations thereof. In another embodiment, the polyester triol is polycaprolactone triol, the third polyol is selected from the group consisting of polyether polyol, polycarbonate polyol, and combinations thereof, and the composition further includes a solid flame retardant agent.

In other embodiments, the third polyol includes polytetramethylene ether glycol.

In another embodiment, the crystalline polyester second polyol exhibits a melting point of at least 40° C.

In one embodiment, the hot melt moisture cure adhesive composition further includes a solid flame retardant agent. In some embodiments, the flame retardant agent has a melt temperature of at least 100° C. In one embodiment, the flame retardant agent has a melt temperature of at least 300° C. In another embodiment, the hot melt moisture cure adhesive composition further includes a solid flame retardant agent that includes hydroxyl groups.

In another embodiment, the prepolymer includes the reaction product of the diisocyanate, from 1% by weight to 6% by weight of the polyester triol, from 1% by weight to 15% by weight of the crystalline polyester second polyol, from 50% by weight to 70% by weight (or even from 50% by weight to 60% by weight) of the third polyol, and a solid flame retardant agent that includes hydroxyl groups.

In other embodiments, the prepolymer includes the reaction product of the diisocyanate, from 1% by weight to 6% by weight of the polyester triol, from 1% by weight to 15% by weight of the crystalline polyester second polyol, from 50% by weight to 70% by weight (or even from 50% by weight to 60% by weight) of the third polyol, and from 1% by weight to 15% by weight of a solid flame retardant agent that includes hydroxyl groups.

In another aspect, the invention features a laminate that includes a cured adhesive composition derived from a hot melt moisture cure adhesive composition disclosed herein, a first substrate, and a second substrate adhered to the first substrate through the cured adhesive composition. In one embodiment, the laminate is a multi-layer textile.

The hot melt moisture cure adhesive composition exhibits good heat resistance, good hydrolysis resistance, and is self-extinguishing.

Other features and advantages will be apparent from the following description of the preferred embodiments and from the claims.

DETAILED DESCRIPTION

The hot melt moisture cure adhesive composition is derived from diisocyanate, a polyester triol first polyol, a crystalline polyester second polyol, and a third polyol different from the first triol and the second polyol. The hot melt moisture cure adhesive composition exhibits good heat resistance and good hydrolysis resistance. The hot melt moisture cure adhesive composition is solid at room temperature and preferably exhibits an initial viscosity of no greater than 20,000 centipoise (cP), no greater than 15,000 cP, or even no greater than 10,000 cP at 121° C., or even at 100° C.

One useful measure of heat resistance is the ability of the cured adhesive composition to maintain its integrity (e.g., to not break down, degrade, melt or soften). Preferably the cured adhesive composition passes the Heat Resistance test method when tested at 232° C., 246° C., or even 260° C.

One useful method of measuring hydrolysis resistance is the Hydrolysis Resistance test method set forth herein. Preferably the cured adhesive composition maintains its integrity after being soaked in 65° C. water for a period of at least 21 days, at least 28 days, or even at least 35 days, when tested according to the Hydrolysis Resistance test method. The cured adhesive composition also preferably retains at least 40%, at least 50%, at least 60%, or even at least 75% of its initial tensile strength after at least 21 days, at least 28 days, or even at least 35 days when tested according to the Hydrolysis Resistance test method.

The cured adhesive composition also preferably is self-extinguishing (i.e., when removed from a flame, the flame extinguishes, and the composition stops burning). One useful method of measuring whether or not a composition is self-extinguishing is the Flame test method set forth herein.

The hot melt moisture cure adhesive composition includes an isocyanate-terminated polyurethane prepolymer. The polyurethane prepolymer includes the reaction product of diisocyanate (e.g., from 5% by weight to 35% by weight, from 10% by weight to 30% by weight, or even from 15% by weight to 30% by weight diisocyanate), polyester triol first polyol (e.g., polycaprolactone triol) (e.g., from 1% by weight to 10% by weight, from 1% by weight to 6% by weight, or even from 1% by weight to 4% by weight polyester triol), crystalline polyester second polyol (e.g., from 1% by weight to 20% by weight, from 1% by weight to 15% by weight, or even from 5% by weight to 15% by weight crystalline polyester polyol), a third polyol (e.g., from 1% by weight to 75% by weight, from 15% by weight to 75% by weight, from 30% by weight to 75% by weight, from 50% by weight to 75% by weight, from 50% by weight to 70% by weight, or even from 50% by weight to 60% by weight of the third polyol, where the third polyol is a polyether polyol (e.g., from 0% by weight to 75% by weight, from 20% by weight to 40% by weight, or even from 25% by weight to 35% by weight polyether polyol), a polycarbonate polyol (e.g., from 0% by weight to 75% by weight, from 20% by weight to 40% by weight, or even from 25% by weight to 35% by weight polycarbonate polyol), or a combination thereof), and optionally a flame retardant agent (e.g., from 0% by weight to 20% by weight, from 1% by weight to 20% by weight, from 1% by weight to 15% by weight, from 1% by weight to 10% by weight, or even from 1% by weight to 7% by weight flame retardant agent).

Diisocyanate

The diisocyanate can be liquid or solid at room temperature. Useful diisocyanates include, e.g., monomeric diisocyanates and oligomeric diisocyanates. The diisocyanate can be any suitable diisocyanate including, e.g., monomeric diisocyanates, oligomeric diisocyanates, aromatic diisocyanates, aliphatic diisocyanates, clycloaliphatic diisocyanates, and combinations thereof. Useful aromatic diisocyanates include, e.g., diphenyl methylene diisocyanate (MDI), (e.g., diphenylmethane-2,4'-diisocyanate (i.e., 2,4'-MDI), diphenylmethane-2,2'-diisocyanate (i.e., 2,2'-MDI), diphenylmethane-4,4'-diisocyanate (i.e., 4,4'-MDI), and combinations thereof), tetramethylxylene diisocyanate, naphthalene diisocyanate (e.g., naphthalene-1,5-diisocyanate, naphthalene-1,4-diisocyanate, and combinations thereof), toluene diisocyanate (TDI) (e.g., 2,4-TDI, 2,6-TDI, and combinations thereof), and combinations thereof. Useful cycloaliphatic diisocyanates include, e.g., 1-isocyanatomethyl-3-isocyanato-1,5,5-trimethyl-cyclohexane (i.e., isophorone diisocyanate (i.e., IPDI), 1-methyl-2,4-diisocyanato-cyclohexane, 1,4-diisocyanato-2,2,6-trimethylcyclohexane (i.e., TMCDI), hydrogenation products of the aforementioned aromatic diisocyanates (e.g., hydrogenated 2,4'-MDI, hydrogenated 2,2'-MDI, hydrogenated 4,4'-MDI and combinations thereof), and combinations thereof. Useful aliphatic diisocyanates include, e.g., hexamethylene diisocyanate (e.g., 1,6-diisocyanato-2,2,4-trimethylhexane, 1,6-diisocyanato-2,4,4-trimethylhexane diisocyanate, and combinations thereof), lysine diisocyanate, dodecane diisocyanate, dimer diisocyanate, and combinations thereof.

Preferably the diisocyanate is monomeric isocyanate. Useful diisocyanate monomers are commercially available under a variety of trade designations including, e.g., under the DESMODUR and MODUR series of trade designations from COVESTRO LLC (Pittsburgh, Pa.) including, e.g., MODUR M 4,4'-MDI, LUPRANATE M 4,4'-MDI from BASF Corp. (Wyandotte, Mich.), RUBINATE 44 from Huntsman Corp. (Auburn Hills, Mich.), and ISONATE M 125 from The Dow Chemical Company (Midland, Mich.).

The polyurethane prepolymer preferably is derived from 5% by weight to 35% by weight, from 10% by weight to 30% by weight, or even from 15% by weight to 30% by weight diisocyanate.

The polyurethane prepolymer optionally is stripped of residual monomeric diisocyanate such that the amount of monomeric diisocyanate is less than 0.5% by weight, less than 0.25% by weight, or even less than 0.1% by weight diisocyanate monomer.

Polyester Triol

The polyester triol includes greater than 2 hydroxyl groups and preferably is a polycaprolactone triol. Suitable polycaprolactone triols have a weight average molecular weight (Mw) of from 300 g/mol to 1500 g/mol, from 300 g/mol to 1000 g/mol, or even 300 g/mol to 900 g/mol. Useful polycaprolactone triols can be derived from at least one alcohol having at least three hydroxyl groups and caprolactone. Useful alcohols that include at least three hydroxyl groups include, e.g., glycerol, triglycerol, polyglycerols, trimethylolmethane, trimethylolethane, trimethylolpropane, 1,2,4-butanetriol, pentaerythritol, diglycerol, bis(trimethylolpropane), phloroglucinol, trihydroxytoluene, trihydroxydimethylbenzene, phloroglucides, hexahydroxybenzene, 1,3,5-benzenetrimethanol, 1,1,1-tris(4'-hydroxyphenyl)methane, 1,1,1-tris(4'-hydroxyphenyl)ethane, bis(trimethylolpropane), sugars (e.g., glucose), and combinations thereof.

Useful polyester triols are commercially available under a variety of trade designations including, e.g., under the CAPA series of trade designations from Ingevity Corporation (North Charleston, S.C.) including CAPA 3050 polycaprolactone triol, CAPA 3091 polycaprolactone triol, and CAPA 4101 polycaprolactone tetrol.

The polyurethane prepolymer is derived from 1% by weight to 10% by weight, from 1% by weight to 6% by weight, or even from 1% by weight to 4% by weight polyester triol.

Crystalline Polyester Polyol

The crystalline polyester polyol includes at least two hydroxyl groups and preferably has a melting point of at least 40° C., at least 70° C., at least 80° C., at least 85° C., at least 90° C., or even from 40° C. to 120° C. Suitable crystalline polyester polyols include the reaction product of at least one diol (e.g., an aliphatic diol having a carbon chain of at least 2 carbon atoms, at least 4 carbon atoms, or even at least 6 carbon atoms, a cycloaliphatic diol, and combinations thereof), and at least one diacid (e.g., an aliphatic diacid, an aromatic diacid, and combinations thereof, having at least 4 carbon atoms, at least 6 carbon atoms, at least 10 carbon atoms, at least 12 carbon atoms, at least 14 carbon atoms, from 6 carbon atoms to 20 carbon atoms, or even from 6 to 16 carbon atoms). Examples of useful aliphatic diols include ethylene glycol, butane diol, hexane diol, octane diol, decane diol, and mixtures thereof. Examples of useful cycloaliphatic diols include 1,4-cyclohexane diol, 1,4-cylcohexanedimethanol, and mixtures thereof. Examples of suitable diacids include succinic acid, adipic acid, sebacic acid, 1,12-dodecanedioic acid, 1,14-tetradecanedioic acid, terephthalic acid, dimerized fatty acids, and combinations thereof.

Other suitable crystalline polyester polyols are polycaprolactone polyols that are formed from caprolactone initiated with a diol such as, e.g., diethylene glycol, 1,4-butane diol, neopentyl glycol, 1,6-hexane diol, and combinations thereof.

Specific examples of useful crystalline polyester polyols include poly[hexane diol adipate], poly[butane diol adipate], poly[hexane diol sebacate], poly[hexane diol dodecanedioate], poly[ethylene glycol tetradecanedioate], poly[ethylene glycol dodecanedioate], polycaprolactone polyol, and mixtures thereof.

Useful crystalline polyester polyols are commercially available under a variety of trade designations including, e.g., under the PIOTHANE series of trade designations from Specialty Resins a Division of Panolam Industries Int'l, Inc. (Auburn, Me.) including PIOTHANE 3500 HA poly[hexane diol adipate], PIOTHANE 3500 HD poly[hexane diol dodecanedioate], and under the DYNACOLL series of trade designations from Evonik Corporation (Parsippany, N.J.) including DYNACOLL 7490 poly[ethylene glycol tetradecanedioate], DYNACOLL 7330 poly[ethylene glycol dodecanedioate], DYNACOLL 7360 poly[hexane diol adipate], DYNACOLL 7380 poly[hexane diol dodecanedioate], and DYNACOLL 7381 poly[hexane diol sebacate].

The polyurethane prepolymer is derived from 1% by weight to 20% by weight, from 1% by weight to 15% by weight, or even from 5% by weight to 15% by weight crystalline polyester polyol.

Third Polyol

Useful third polyols include, e.g., polyether polyol, polycarbonate polyol, and combinations thereof. The polyurethane prepolymer is derived from 1% by weight to 75% by weight, from 15% by weight to 75% by weight, from 30% by weight to 75% by weight, from 50% by weight to 75% by weight, from 50% by weight to 70% by weight, or even from 50% by weight to 60% by weight of the third polyol.

Polyether Polyol

Polyether polyols suitable as the third polyol include linear and branched polyether homopolymers and copolymers. Polyether polyol copolymers can have a variety of configurations including, e.g., random and block configurations. Preferably the polyether polyol has a weight average molecular weight of from 600 g/mol to 4000 g/mol.

The polyether polyol can be derived from oxide monomer (e.g., ethylene oxide, propylene oxide, 1,2-butylene oxide, 1,4-butylene oxide, tetrahydrofuran, and combinations thereof). Particularly useful polyether polyols include, e.g., polyethylene glycol, polypropylene glycol, the reaction product of propylene oxide or butylene oxide capped or copolymerized with ethylene oxide (e.g., ethylene oxide capped polypropylene glycol), polytetramethylene ether glycol, and combinations thereof.

Suitable commercially available polyether polyols are available under a variety of trade designations including, e.g., under the TERATHANE series of trade designations from The Lycra Company (Wilmington, Del.) including TERATHANE 2000 polytetramethylene ether glycol and TERATHANE 1000 polyether glycol, under the VORANOL series of trade designations from Dow Chemical (Midland, Mich.) including VORANOL 220-056 polypropylene ether polyol and VORANOL 2000 L polypropylene glycol, under the DESMOPHEN, ARCOL and ACCLAIM series of trade designations from Covestro LLC (Pittsburgh, Pa.) including DESMOPHEN 2061 BD polypropylene ether polyol, DESMOPHEN 2060 BD polypropylene ether polyol, ARCOL PPG-2000 polypropylene glycol, ARCOL PPG-1000 polypropylene glycol, and ACCLAIM Polyol 703 polypropylene glycol, and under the POLY-G series of trade designations from Monument Chemical Kentucky LLC (Brandenburg, Ky.) including POLY-G 20-56 polypropylene glycol and POLY-G 55-56 ethylene-oxide capped polypropylene glycol.

The polyurethane prepolymer optionally is derived from 0% by weight to 75% by weight, from 20% by weight to 40% by weight, or even from 25% by weight to 35% by weight polyether polyol.

Polycarbonate Polyol

Polycarbonate polyols suitable as the third polyol include aliphatic polycarbonate polyols, cyclic aliphatic polycarbonate polyols, and aromatic polycarbonate polyols. The polycarbonate polyol can be solid at room temperature or liquid at room temperature. The polycarbonate polyol can be derived from an organic carbonate and an aliphatic alcohol that includes at least two hydroxyl groups.

Suitable organic carbonates include, e.g., dialkyl carbonates, aromatic/aliphatic carbonates, and diaryl carbonates including, e.g., dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate, didodecyl carbonate, diphenyl carbonate, ethyl phenyl carbonate, dibenzyl carbonate, and combinations thereof.

Suitable dihydric alcohols include, e.g., ethylene glycol, diethylene glycol, triethylene glycol, 1,2- and 1,3-propanediol, 2-methyl-1,3-propanediol, dipropylene glycol, tripropylene glycol, neopentyl glycol, 1,2-, 1,3-, and 1,4-butanediol, 2-methyl-1,4-butanediol, 1,2-, 1,3-, and 1,5-pentanediol, 1,6-hexanediol, 1,8-octanediol, 2-methyl-1,8-octanediol, 1,9-nonanediol, 1,10-decanediol, 1,11-undecanediol, 1,12-dodecanediol, 1,13-tridecanediol, 1,14-tetradecanediol, 1,16-hexadecandediol, 1,18-octadecanediol, 1,12-octadecanediol, cyclopentanediol, cyclohexanediol, cyclohexanedimethanol, bis(4-hydroxycyclohexyl)methane, bis(4-hydroxycyclohexyl)ethane, 2,2-bis(4-hydroxycyclohexyl)propane, and combinations thereof.

Useful polycarbonate polyols are commercially available under a variety of trade designations including, e.g., under the ETERNACOLL series of trade designations from UBE Industries, Ltd. (Tokyo, Japan) including ETERNACOLL UH-200, under the RAVECARB series of trade designations from Caffaro Industrie SPA (Italy) including RAVECARB 106 aliphatic polycarbonate glycol, RAVECARB 102 aliphatic polycarbonate glycol, RAVECARB 107 aliphatic polycarbonate glycol, under the OXYMER series of trade designations from Perstorp Holdings AB (Sweden) including OXYMER M112 polycarbonate polyol, and under the DURANOL series of trade designations from Asahi Kasei Corporation (Japan) including, e.g., DURANOL T6002 polycarbonate polyol.

The polyurethane prepolymer optionally is derived from 0% by weight to 75% by weight, from 20% by weight to 40% by weight, or even from 25% by weight to 35% by weight polycarbonate polyol.

Flame Retardant Agent

The hot melt moisture cure adhesive composition optionally includes a flame retardant agent. The flame retardant agent is solid at room temperature and includes bromine, phosphorous, antimony trioxide, antimony pentoxide, or a combination thereof. The flame retardant agent optionally includes at least one functional group. The flame retardant agent preferably exhibits a melt temperature of at least 100° C., at least 110° C., at least 120° C., at least 250° C., or even at least 300° C. Useful flame retardant agents that include functional groups exhibit a melt temperature of at least 100° C., at least 110° C., or even at least 115° C. Useful flame retardant agents that do not include functional groups exhibit a melt temperature of at least 250° C. or even at least 300° C.

For those flame retardant agents that include at least one functional group, the flame retardant agent can be incorporated into the backbone of the polyurethane prepolymer during the formation of the polyurethane prepolymer. Useful functional groups that enable the flame retardant agent to be incorporated into the polyurethane prepolymer include, e.g., hydroxyl, carboxyl, amine, and thiol groups, and combinations thereof.

Useful flame retardant agents include, e.g., tetrabromobisphenol A (which is also known as TBA), tetrabromobisphenol A-bis-(2-hydroxyethylether) (TBA-2), tetrabromobisphenol S, 4-isopropylidene bis(2,6-dibromophenol), isopropylidene bis[2-(2,6-dibromophenoxy)ethanol], bis(4-(2-hydroxyethoxy)-3,5-dibromophenyl) sulfone heptakis (dipropylene glycol) triphosphite, tris(dipropylene glycol) phosphate, diethyl,N-bis(2-hydroxyethyl) aminoethanol phosphonate, phosphonated polyols and combinations thereof.

The hot melt moisture cure adhesive composition can optionally include additional flame retardant agents including, e.g., antimony trioxide, antimony pentoxide, and combinations thereof.

Suitable commercially available flame retardant agents are available under a variety of trade designations including, e.g., TAKEMODO series of trade designations from Takemoto Oil & Fat Co., Ltd. (Japan) including TBA-2 tetrabromo-bis-phenol-A ethylene oxide-2 mol, and the SAYTEX series of trade designations from Albemarle Corp. (Charlotte, N.C.) including SAYTEX 8010 ethylene-1,2-bis(pentabromophenyl), SAYTEX 8010ZD ethylene-1,2-bis(pentabromophenyl), SAYTEX 102E decabromodiphenyl oxide, SAYTEX RB-49 tetrabromophthalic anhydride, SAYTEX BT-93W ethylenebistetrabromophthalimide, and SAYTEX BT-93 ethylene bistetrabromophthalimide.

The hot melt moisture cure adhesive composition optionally includes from 0% by weight to 20% by weight, from 1% by weight to 20% by weight, from 1% by weight to 15% by weight, from 1% by weight to 10% by weight, or even from 1% by weight to 7% by weight flame retardant agent.

Alternatively, or in addition, the polyurethane prepolymer is derived from 0% by weight to 20% by weight, from 1% by weight to 20% by weight, from 1% by weight to 15% by weight, from 1% by weight to 10% by weight, or even from 1% by weight to 7% by weight flame retardant agent.

Catalyst

The hot melt moisture cure adhesive composition optionally includes a catalyst to increase the cure reaction rate. Useful catalysts include ether and morpholine functional groups, examples of which include di(2,6-dimethyl morpholinoethyl) ether and 4,4'-(oxydi-2,1-ethanediyl)bis-morpholine (DMDEE). Suitable commercially available catalysts include, e.g., JEFFCAT DMDEE 4,4'-(oxydi-2,1-ethanediyl)bis-morpholine, which is available from Huntsman Corp. (Houston, Tex.). Other suitable catalysts include, e.g., metallic carboxylates and dibutyl tin dilaurate. Useful metallic carboxylates include, e.g., cobalt carboxylates, manganese carboxylates, and mixtures thereof.

When a catalyst is present, the hot melt moisture cure adhesive composition includes from about 0.01% by weight to about 0.5% by weight catalyst.

Additives

The hot melt moisture cure adhesive composition optionally includes a variety of additional components including, e.g., antioxidants, stabilizers, additional polymers (e.g., thermoplastic polymers, thermoplastic elastomeric polymers, and combinations thereof), tackifying resins, adhesion promoters, ultraviolet light stabilizers, rheology modifiers, corrosion inhibitors, colorants (e.g., pigments and dyes), fillers, nucleating agents, and combinations thereof. Likewise, the polyurethane prepolymer optionally can be derived from additional polyols including, e.g., polyester polyols, polyether polyols, and combinations thereof.

Useful antioxidants include, e.g., pentaerythritol tetrakis [3,(3,5-di-tert-butyl-4-hydroxyphenyl)propionate], 2,2'-methylene bis(4-methyl-6-tert-butylphenol), phosphites including, e.g., tris-(p-nonylphenyl)-phosphite (TNPP) and bis(2,4-di-tert-butylphenyl)4,4'-diphenylene-diphosphonite, di-stearyl-3,3'-thiodipropionate (DSTDP), and combinations thereof. Useful antioxidants are commercially available under a variety of trade designations including, e.g., the IRGANOX series of trade designations including, e.g., IRGANOX 1010, IRGANOX 565, and IRGANOX 1076 hindered phenolic antioxidants, and IRGAFOS 168 phosphite antioxidant, all of which are available from BASF Corporation (Florham Park, N.J.), and ETHYL 702 4,4'-methylene bis(2,6-di-tert-butylphenol), which is available from Albemarle Corporation (Baton Rouge, La.). When present, the hot melt moisture cure adhesive composition includes from 0% by weight to 3% by weight, or even from 0.1% by weight to 2% by weight antioxidant.

Use

The hot melt moisture cure adhesive composition is useful in a variety of applications including, e.g., bonding two substrates together to form a laminate. The hot melt moisture cure adhesive composition can be formulated to be suitable for use in bonding substrates of a variety of forms including, e.g., nonwovens (e.g., spun bond, melt-blown, staple, flashspun, and air-laid nonwovens), wovens (e.g., woven fabrics), knitted fabrics, foams, membranes (e.g., microporous membranes, nonporous membranes, monolithic membranes, and combinations thereof), fibers, threads, yarns, filaments, felts, sheets (e.g., metal sheet, polymer sheet, glass sheet, continuous sheets, discontinuous sheets, and combinations thereof), films (e.g., polymer film, metallized polymer film, continuous films, discontinuous films, and combinations thereof), foils (e.g., metal foil), textiles (e.g., single layer, multilayer, woven, nonwoven, knitted fabrics, films, metal foils, membranes, foams, and combinations thereof), and combinations thereof.

Suitable substrates are derived from a variety of components including, e.g., cotton, wool, silk, leather, polyester, polyamide (e.g. Nylon-6 and Nylon-6,6), polyurethane, thermoplastic polyurethane, polyether-polyurea copolymer, polytetrafluoroethylene, other polymers (e.g., polycarbonate, polyolefin (e.g., polypropylene, polyethylene, low density polyethylene, linear low density polyethylene, high density polyethylene, polypropylene, and oriented polypropylene, copolymers of polyolefins and other comonomers), ethylene-vinyl acetate, ethylene-methacrylic acid ionomers, ethylene-vinyl-alcohols, polycarbonates, polyvinyl chloride, polyvinylidene chloride, cellulosics (e.g., Rayon, nitrocellulose, and cellulose acetate), polystyrene, and epoxy), elastomer (e.g., butyl rubber, styrene-butadiene-styrene, styrene-isoprene-styrene, styrene-ethylene/propylene-styrene and styrene-ethylene/butylene-styrene) polymer composites (e.g., composites of polymer and fiber, metal, cellulose, glass, polymer, and combinations thereof), metal (aluminum, copper, zinc, lead, gold, silver, platinum, and magnesium, and metal alloys such as steel, tin, brass, and magnesium and aluminum alloys), carbon-fiber composite, other fiber-based composite, graphene, fillers, glass (e.g., alkali-aluminosilicate toughened glass and borosilicate glass), quartz, boron nitride, gallium nitride, sapphire, silicon, carbide, ceramic and combinations thereof.

The hot melt moisture cure adhesive composition can be formulated to be suitable for use in bonding substrates having a variety of properties including, e.g., porous substrates (e.g., breathable and microporous substrates), flexible substrates (i.e., the substrate can be bent using no greater than the force of two hands), rigid substrates (i.e., the substrate cannot be bent by an individual using two hands or will break if an attempt is made to bend the substrate with two hands), polar substrates, nonpolar substrates, waterproof substrates, hydrophobic substrates, hydrophilic substrates, chemical resistant substrates, elastomeric substrates, conductive substrates, insulating substrates, transparent substrates, substrates that exhibit biocide properties, and combinations thereof.

The hot melt moisture cure adhesive composition is suitable for use in a variety of industrial applications including, e.g., textiles (e.g., adhering layers of textile materials (e.g., woven and nonwoven fabrics, textile to membrane, textile to foam, and combinations thereof)), adhering components of automobiles, sealing components of automobiles, applications in the automotive industry (e.g., vehicle construction (e.g., head liner)), recreational vehicles, appliances, filters, electronic assemblies, wood materials, plastic materials, laminated panels, edge-banding, profile wrapping, and packaging.

The hot melt moisture cure adhesive composition can be applied using any suitable application method including, e.g., manual or automatic fine line dispensing, slot die coating, roll coating, gravure coating, transfer coating, pattern coating, screen printing, spray coating, filament coating, by extrusion, air knife, trailing blade, brushing, dipping, doctor blade, offset gravure coating, rotogravure coating, and combinations thereof. The hot melt moisture cure adhesive composition can be in a variety of forms including, e.g., in the form of continuous and discontinuous (e.g., pattern) coatings, beads, layers and films, and each form can include a single layer or multiple layers.

The hot melt moisture cure adhesive composition can be applied at any suitable temperature including, e.g., from 90° C. to 150° C., or even from 100° C. to 130° C.

The surface of the substrate, on which the hot melt moisture cure adhesive composition is applied, optionally is treated to enhance adhesion using any suitable method for enhancing adhesion to the substrate surface including, e.g., corona treatments, chemical treatments, flame treatments, and combinations thereof.

The cured adhesive composition maintains adhesion to a variety of substrates under a variety of conditions including, e.g., washing (e.g., laundering), drying, dry cleaning, and sterilization (e.g., steam, ethylene oxide, heat, and radiation (e.g., infrared, ultraviolet light, and electron beam radiation) and combinations thereof).

The bond formed by the cured adhesive composition exhibits good chemical resistance to a variety of chemicals including, e.g., ethanol, isopropanol, and diethyltoluamide.

The invention will now be described by way of the following examples. All parts, ratios, percentages and amounts stated in the Examples are by weight unless otherwise specified.

EXAMPLES

Test Procedures

Test procedures used in the examples include the following. All ratios and percentages are by weight unless otherwise indicated. The procedures are conducted at room temperature (i.e., an ambient temperature of from about 20° C. to about 25° C.) unless otherwise specified.

Viscosity Test Method

Viscosity is measured on a molten sample that is at a temperature of 121° C. using a Brookfield Thermosel Viscometer using a number 27 spindle at 10 rotations per minute.

Heat Resistance Test Method

Heat resistance is determined according to the following test method. A film is prepared by applying the composition to be tested on a 55 pound C2S release liner (or equivalent) at a film thickness of 20 mil (0.508 mm). The film is allowed to cure for at least three days at 25° C. and 50% relative humidity. The film is removed from the release liner, and samples, 5 cm long by 1 cm wide, are cut from the 20 mil film. The samples are then placed on the shiny side of an aluminum foil holder (HANDI-FOIL standard foil wrap (or equivalent)) and then placed in an oven that has been heated to the specified temperature (e.g., 232° C., 246° C., and 260° C.). The samples are kept in the oven for 5 minutes at the specified temperature, are then removed from the oven, and then immediately tested by attempting to remove (e.g., peel) the adhesive film from the aluminum foil holder. A sample that can be removed intact without breaking into parts or stretching is assigned a pass rating. A sample that breaks into parts, stretches, or cannot be removed from the aluminum foil holder is assigned a fail rating.

Hydrolysis Resistance Test Method

Hydrolysis resistance is determined according to the following test method. A film is prepared by applying the composition to be tested on a 55 pound C2S release liner (or equivalent) at a film thickness of 20 mil (0.508 mm). The film is allowed to cure for at least seven days at 25° C. and 50% relative humidity. The film is removed from the release liner, and Type IV dogbones are cut from the film. The initial tensile strength of a set of five samples is measured (Ti). Then samples are soaked in 150° F. (65° C.) deionized water. After each soaking period of 7, 14, 21 28, and 35 days, a set of five samples is removed from the water and dried. The tensile strength of the dried samples is then measured (Tf). The result is reported in pounds per square inch (psi).

Flame Test Method

Flame resistance is determined according to the following test method. A film is prepared by applying the composition to be tested on a 55 pound C2S release liner (or equivalent) at a film thickness of 20 mil (0.508 mm). The film is allowed to cure for at least three days at 25° C. and 50% relative humidity. The film is removed from the release liner, and samples, 1 cm×15 cm, are cut from the film. The samples are then placed into a blue flame (which is about 1 inch in height) of a Bunsen burner using methane gas at a flow rate of 100 mL/min, held in the flame in a horizontal position for 5 seconds, and then immediately removed from the flame and observed. If the sample is not on fire upon removal from the flame of the Bunsen burner, the sample is recorded as self-extinguishing and assigned a pass rating. If the sample is on fire and the flame extinguishes on its own within 5 seconds, the sample is recorded as self-extinguishing and assigned a pass rating. If the sample is on fire and the flame does not extinguish on its own within 5 seconds, the sample is not self-extinguishing and is assigned a fail rating.

Example E1-E8 and Controls C1-C2

The hot melt moisture cure adhesive compositions of Examples E1-E8 and Controls C1-C2 were prepared by combining all of the components set forth in Table 1 except the diisocyanate, in the amounts set forth in Table 1. The mixture was then heated to 121° C. until all of the components were melted. A vacuum was then applied and mixing was started. Once the mixture reached a temperature of 121° C. it was immediately cooled to 102° C. and mixing was continued for one hour under vacuum. The temperature was then lowered to 82° C., the vacuum was removed, a nitrogen blanket was applied, and diisocyanate monomer was added to the mixture. The mixture was allowed to react for one hour while the temperature was maintained at 110° C. under vacuum with mixing.

The compositions of Examples E1-E3 and E6-E8 and Controls C1-C2 were tested according to the Viscosity test method, with the exception that testing of the compositions of Examples E4 and E5 was at 20 rotations per minute (rpm) instead of 10 rpm.

TABLE 1

|  | E1 | E2 | E3 | E4 | E5 | E6 | E7 | E8 | C1 | C2 |
|---|---|---|---|---|---|---|---|---|---|---|
| CAPA 3050[1] | 5 | 4 | 3 | 2 | 3 | 3 | 3 | 3 | 0 | 3 |
| ARCOL LHT-240[2] | 0 | 0 | 0 | 0 | 0 | 0 | 0 | 0 | 3 | 0 |
| PIOTHANE 3500HD[3] | 10 | 10 | 10.5 | 9.5 | 10.5 | 10.5 | 12.5 | 0 | 11 | 0 |
| PIOTHANE 3500HA[4] | 0 | 0 | 0 | 0 | 0 | 0 | 0 | 10.5 | 0 | 0 |
| ETERNACOLL UH-200[5] | 28 | 28 | 28 | 28 | 0 | 58 | 28 | 28 | 28 | 28 |
| TERATHANE 2000[6] | 29 | 29 | 30 | 32 | 58 | 0 | 30 | 30 | 30 | 40 |
| TBA-2[7] | 5 | 5 | 5 | 5 | 5 | 5 | 0 | 5 | 5 | 5 |
| SAYTEX 102E[8] | 0 | 0 | 0 | 0 | 0 | 0 | 5 | 0 | 0 | 0 |
| ISONATE 125M[9] | 22.5 | 23.5 | 23 | 23 | 23 | 23 | 21 | 23 | 22.5 | 23.5 |
| IRGANOX 1010[10] | 0.46 | 0.46 | 0.44 | 0.44 | 0.44 | 0.44 | 0.44 | 0.44 | 0.44 | 0.44 |
| MODAFLOW Resin[11] | 0.01 | 0.01 | 0.01 | 0.01 | 0.01 | 0.01 | 0.01 | 0.01 | 0.01 | 0.01 |
| Phosphoric Acid | 0.03 | 0.03 | 0.05 | 0.05 | 0.05 | 0.05 | 0.05 | 0.05 | 0.05 | 0.05 |
| Viscosity @ 121° C. (cP) | 16,050 | 6,450 | 5,500 | 3,700 | 2,850 | 11,100 | 5,500 | 7,750 | 5,075 | 5,000 |

[1] = polycaprolactone triol
[2] = 700 molecular weight polypropylene oxide-based polyether triol (Covestro, L.L.C, Pittsburgh, Pennsylvania)
[3] = hexane diol/dodecanedioic acid polyester polyol having a DSC melting point of about 70° C. (Panolam Industries International, Inc., Auburn, Maine)
[4] = hexane diol/adipic acid polyester polyol having a DSC melting point of about 55° C. (Panolam Industries)
[5] = polycarbonate diol (UBE Industries, LTD, Yamaguchi, Japan)
[6] = polytetramethylene glycol (The Lycra Company, Wilmington, Delaware)
[7] = tetrabromo-bis-phenol-A ethylene oxide-2 moles having a melt temperature of 118° C. (Takemoto Oil and Fat Co., LTD)
[8] = decabromodiphenyl oxide having a melt temperature of 304° C. (Albermarle Corp)
[9] = 4,4'-diphenylmethate diisocyanate (The Dow Chemical Company, Midland, Michigan)
[10] = antioxidant
[11] = defoamer The compositions of Examples E1-E8 and Controls C1-C2 were tested according to the Heat Resistant and Flame test methods. The results are reported in Table 2.

TABLE 2

| Heat Resistance | E1 | E2 | E3 | E4 | E5 | E6 | E7 | E8 | C1 | C2 |
|---|---|---|---|---|---|---|---|---|---|---|
| 232° C. | Pass | Pass | Pass | Pass | Pass | Pass | Pass | Pass | Pass | Pass |
| 246° C. | Pass | Pass | Pass | Pass | Pass | Pass | Pass | Pass | Pass | Pass |
| 260° C. | Pass | Pass | Pass | Pass | Pass | Pass | Pass | Pass | Fail | Fail |
| Flame Test | Pass | Pass | Pass | Pass | Pass | Pass | Pass | Pass | Pass | Pass |

The compositions of Examples E3, E5 and E6 were tested according to the Hydrolysis Resistant test method. The results are reported in Table 3.

TABLE 3

| Hydrolysis Resistance (psi) | E3 | E5 | E6 |
|---|---|---|---|
| Initial | 5303 | 3239 | 5158 |
| After 7 days | 4409 | 2792 | 5632 |
| After 14 days | 4832 | 3020 | 5348 |
| After 21 days | 4918 | 3386 | 5152 |
| After 28 days | 4530 | 3368 | 5262 |
| After 35 days | 4294 | 3130 | 4651 |

Other embodiments are within the claims.

What is claimed is:

1. A hot melt moisture cure adhesive composition comprising:
   a polyurethane prepolymer comprising the reaction product of
      diisocyanate,
      from 1% by weight to 10% by weight of a polyester triol first polyol,
      from 1% by weight to 20% by weight of a crystalline polyester second polyol, and
      from 30% by weight to 75% by weight of at least one third polyol different from the first and second polyols,
   the composition
      passes Heat Resistance test method when tested at 260° C.,
      maintains at least 50% of its tensile strength after 35 days when tested according to Hydrolysis Resistance test method,
      or a combination thereof.

2. The hot melt moisture cure adhesive composition of claim 1, wherein the prepolymer comprises the reaction product of
   the diisocyanate,
   from 1% by weight to 6% by weight of the polyester triol,
   from 1% by weight to 15% by weight of the crystalline polyester second polyol, and
   from 50% by weight to 75% by weight of the at least one third polyol.

3. The hot melt moisture cure adhesive composition of claim 1 further comprising a flame retardant, the composition being self-extinguishing.

4. The hot melt moisture cure adhesive composition of claim 1, wherein the at least one third polyol is selected from the group consisting of polyether polyol, polycarbonate polyol, and combinations thereof.

5. The hot melt moisture cure adhesive composition of claim 1, wherein the polyester triol comprises polycaprolactone triol and the at least one third polyol is selected from the group consisting of polyether polyol, polycarbonate polyol, and combinations thereof.

6. The hot melt moisture cure adhesive composition of claim 1, wherein the third polyol comprises polytetramethylene ether glycol.

7. The hot melt moisture cure adhesive composition of claim 1, wherein the crystalline polyester second polyol exhibits a melting point of at least 40° C.

8. The hot melt moisture cure adhesive composition of claim 1 further comprising a solid flame retardant agent.

9. A hot melt moisture cure adhesive composition comprising:
   a polyurethane prepolymer comprising the reaction product of
      diisocyanate,
      from 1% by weight to 10% by weight of a polyester triol first polyol,
      from 1% by weight to 20% by weight of a crystalline polyester second polyol, and
      from 30% by weight to 75% by weight of at least one third polyol different from the first and second polyols; and
   a solid flame retardant agent.

10. The hot melt moisture cure adhesive composition of claim 9, wherein the flame retardant agent has a melt temperature of at least 300° C.

11. The hot melt moisture cure adhesive composition of claim 9 further comprising a solid flame retardant agent comprising hydroxyl groups.

12. The hot melt moisture cure adhesive composition of claim 9, wherein the prepolymer comprises the reaction product of
   the diisocyanate,
   from 1% by weight to 6% by weight of the polyester triol,
   from 1% by weight to 15% by weight of the crystalline polyester second polyol, and
   from 50% by weight to 70% by weight of the at least one third polyol.

13. The hot melt moisture cure adhesive composition of claim 1, wherein the prepolymer comprises the reaction product of
   the diisocyanate,
   from 1% by weight to 6% by weight of the polyester triol,
   from 1% by weight to 15% by weight of the crystalline polyester second polyol,
   from 50% by weight to 70% by weight of the at least one third polyol, and
   from 1% by weight to 15% by weight solid flame retardant agent comprising hydroxyl groups.

14. A laminate comprising:
   a cured adhesive composition derived from the hot melt moisture cure adhesive composition of claim 9;
   a first substrate; and
   a second substrate adhered to the first substrate through the cured adhesive composition.

15. The laminate of claim 14, wherein the laminate comprises a multi-layer textile.

16. The hot melt moisture cure adhesive composition of claim 2 further comprising a solid flame retardant agent.

17. The hot melt moisture cure adhesive composition of claim 9, wherein the composition is self-extinguishing.

18. A hot melt moisture cure adhesive composition comprising:
   a polyurethane prepolymer comprising the reaction product of
      diisocyanate,
      from 1% by weight to 10% by weight of a polyester triol first polyol comprising polycaprolactone triol,
      from 1% by weight to 20% by weight of a crystalline polyester second polyol, and
      from 30% by weight to 75% by weight of at least one third polyol different from the first and second polyols.

19. The hot melt moisture cure adhesive composition of claim 18 further comprising a solid flame retardant agent.

20. The hot melt moisture cure adhesive composition of claim 9, wherein the flame retardant agent has a melt temperature of at least 100° C.

* * * * *